Sept. 12, 1950  V. N. BRADEN ET AL  2,522,340
PNEUMATIC-TYPE AIRCRAFT LANDING GEAR
Filed Nov. 21, 1946  2 Sheets-Sheet 1
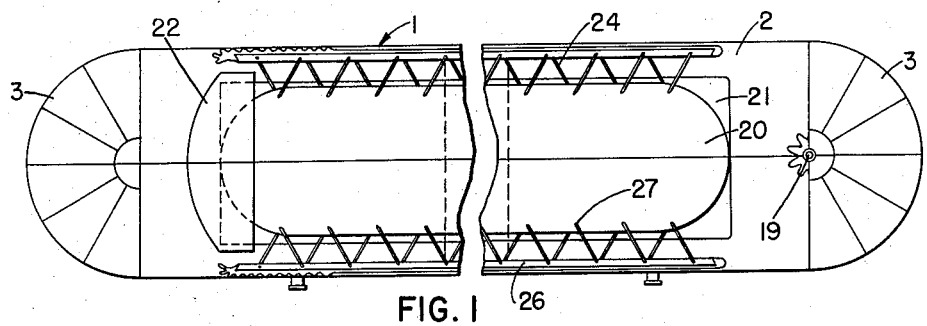
FIG. 1
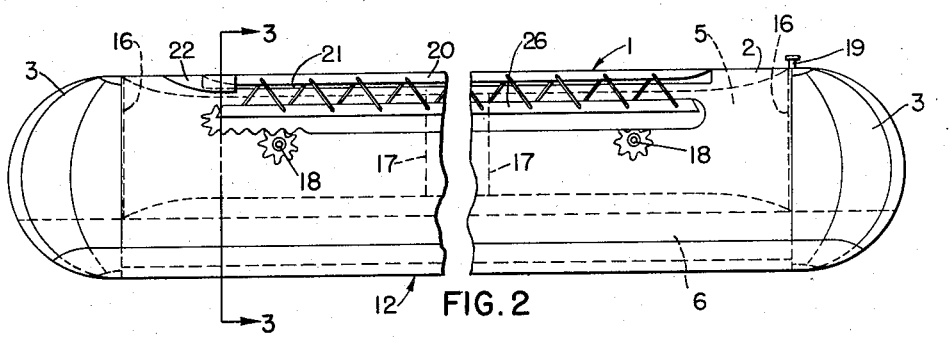
FIG. 2
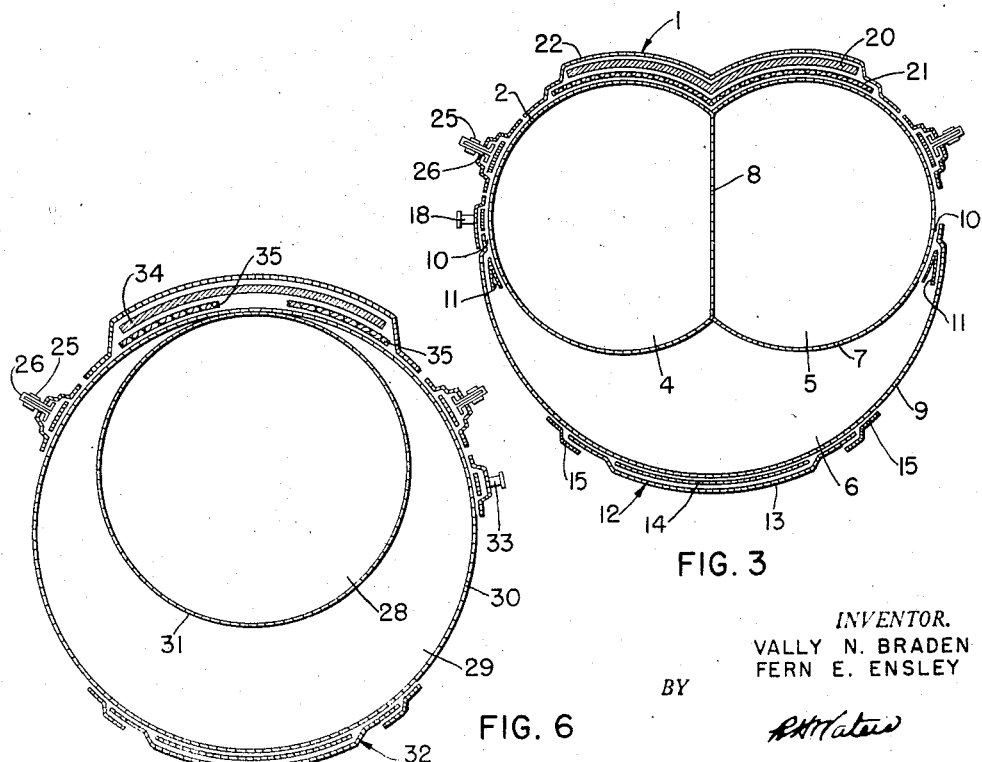
FIG. 3
FIG. 6
*INVENTOR.*
VALLY N. BRADEN
FERN E. ENSLEY
BY
ATTORNEY

INVENTOR.
VALLY N. BRADEN
FERN E. ENSLEY

BY

ATTORNEY

Patented Sept. 12, 1950

2,522,340

UNITED STATES PATENT OFFICE 2,522,340

PNEUMATIC-TYPE AIRCRAFT LANDING GEAR

Vally N. Braden, New Haven, Conn., and Fern E. Ensley, Akron, Ohio, assignors to Wingfoot Corporation, Akron, Ohio, a corporation of Delaware Application November 21, 1946, Serial No. 711,454

9 Claims. (Cl. 244—105)

The present invention relates to a pneumatic-type universal landing gear for aircraft. More particularly, the invention is concerned with a form of inflatable aircraft landing gear fabricated from rubberized fabric material together with a mounting means therefor.

The landing gear of the present invention is particularly advantageously employed on helicopters and other similar forms of aircraft to enable such ships to land on and take off from a landing surface whether it be land or water. It is well known in the operation of helicopter aircraft that difficulty is experienced in landing and take-off due to the presence of extraordinary static and dynamic loads. Thus, the present invention contemplates a multiple compartmented structure in which certain of the inflatable compartments are designed to take the forces induced by the operation of the motors of the craft while at rest while others absorb the dynamic load of the aircraft while engaged in landing and take-off operations generally.

It is, therefore, an object of the present invention to provide a form of multi-compartmented inflatable landing gear for use in aircraft.

It is another object of the present invention to provide a pneumatic float capable of serving both as a landing gear and as a flotation gear for aircraft, particularly aircraft of the helicopter type.

It is a further object of the invention to provide a universal pneumatic-type landing gear which will be capable of absorbing all dynamic loads incident to the aircraft in its landing and take-off operations from any available landing surface.

Another and still further object of the present invention is to provide a satisfactory and advantageous means for mounting the float structures upon the average commercially-built plane.

It is a still further object of the present invention to provide a form of universal landing gear for aircraft which, besides possessing all of the foregoing important attributes, has the added advantage of being capable of being manufactured economically and in large numbers to enable the cost thereof to be low.

Other objects and advantages of the float structure of the present invention will become apparent as the description of the principles of the present invention proceeds.

Figure 5:
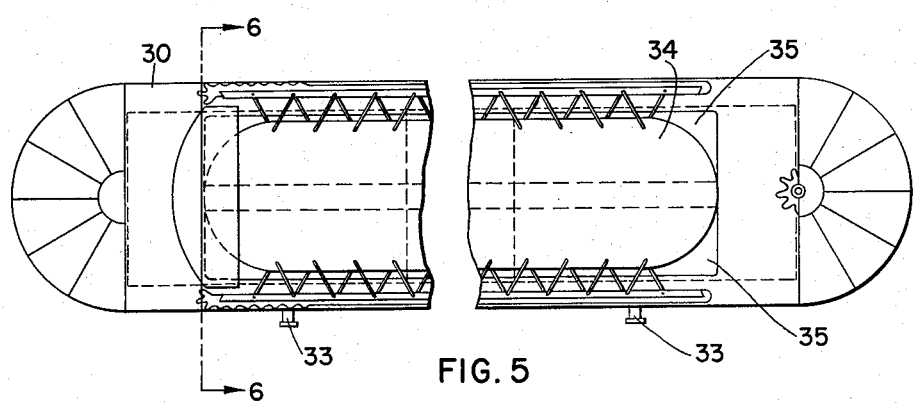
Figure 4:
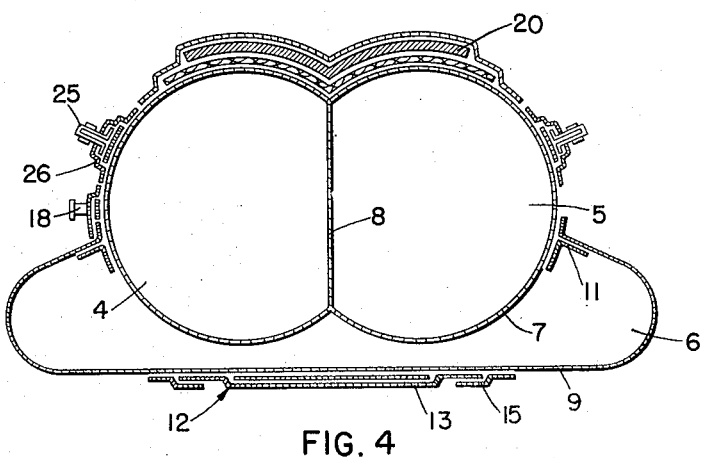

Fig. 1 represents a plan view of one form of float structure embodying the principles of the present invention. Fig. 2 is a side elevation of the float structure shown in Fig. 1. Fig. 3 is a vertical cross-section taken through the float structure of Fig. 2 along the line 3—3 therein. Fig. 4 is a distorted vertical cross-section corresponding generally to Fig. 3 illustrating the action of the float structure when at rest on a landing surface. Fig. 5 is a plan view of a modified form of float structure corresponding generally to that of Figs. 1 and 2. Fig. 6 is a vertical cross-section taken along the line 6—6 in Fig. 5.

The landing gear or float structure of the present invention is identified generally by the reference character 1. The float structure 1 is fabricated from rubberized fabric material in the form of a generally cylindrical portion 2 having substantially hemispherically shaped ends 3. The generally cylindrical portion 2 embodies the internally disposed fluid-tight inflatable compartments 4, 5, and 6.

As will be seen from Fig. 3, the compartments 4 and 5 are substantially identical in shape and disposed in mutually parallel contiguous relation. The rubberized fabric material 7 forms the enclosure wall of the compartments 4 and 5 while the common wall or membrane 8 serves to define the separate compartments from each other and is secured at its ends to the end portions 3. The compartment 6 is formed by the rubberized fabric envelope 9 which cooperates with the fabric 7 to enclose the same.

The fabric envelope 9 is advantageously secured to the outer fabric wall portion 7 as at 10 and the joint is sealed by means of crotch tapes 11. The lowermost arcuate outer surface of the fabric envelope 9 is provided with a chafer strip assembly 12 which serves to prolong the life of the float structure 1 by protecting the same at points of extreme wear. The chafer strip assembly 12 embodies a tough wear resistant rubberized fabric strip 13 with a cushion strip 14 inserted therein against the surface of the envelope 9 with narrow tapes 15 protecting the marginal edges of the wear strip 13. It will be understood that the wear strip 13 may also be made of a tough vulcanized rubber stock, provided it does not materially affect the weight of the float structure 1.

At each end of the compartments 4 and 5 is located a vertical bulkhead member 16 (see Fig. 2) disposed internally of the cylindrical portion 2 at the joint therein formed by the end portions 3. The compartments 4 and 5 taper inwardly beyond the bulkheads 16 to join with the end portions 3. Similar vertical bulkheads 17 may be employed at spaced intervals axially of the compartments 4 and 5 intermediate the ends thereof to divide these compartments into a plurality of individual chambers. A corresponding number of valves 18 for the admission of fluid under pressure to each chamber of the compartments 4 and 5 are secured to the external wall of the fabric 7.

The compartment 6 may advantageously be interconnected with the interior of the hemispherical end portions 3. The compartment 6, thus extending from end to end of the float structure 1, is advantageously inflated in its entirety by means of a valve 19. If it is found to be desirable, suitable bulkheads may be provided in the compartment 6 to divide the same into smaller compartments, although this construction may affect the flexibility of the base of the float structure 1 to some extent.

The float structure 1 may be mounted upon the aircraft in any suitable fashion. One form of mounting which is highly advantageous employs the standard gear or connections of the aircraft for mounting a rigid plate or saddle 20 which may be fabricated from aluminum, magnesium, or other metallic alloys as well as any other suitable strong formable material to conform to the shape of the upper surface of the float structure 1. In this case, the saddle 20 is of arcuate form in cross-section.

The saddle 20 has a felt chafer strip 21 disposed between said saddle and the surface of the fabric 7 to prevent undue wear and chafing of the fabric 7 by the saddle. The saddle 20 is held in place by means of a pocket 22 into which an end of the saddle fits adjacent the forward end of the float structure 1. The fabric strip 21 and the saddle 20 are securely held in place by means of a lacing cord 24 laced through eyes 25 in the lacing strip 26 and apertures 27 in the marginal edges of the saddle 20.

In use, the float structure 1 is inflated with a suitable fluid under pressure, ordinarily air. For most advantageous operation of the float structure 1, the compartments 4, 5, and 6 are inflated with air under pressure, the pressure of the air within the compartments 4 and 5 being greater than the pressure in the compartment 6. The lower pressure of the air in compartment 6 enables it to deflect under load when in contact with the landing surface to support the aircraft and to provide a cushion therefor. The compartment 4 and 5, being less flexible, serve to provide an added factor of safety and a positive support although ordinarily these compartments do not actually contact the landing surface excepting under emergency conditions.

Such float structures 1 contemplated by the invention are particularly advantageously adapted to be employed with helicopter-type aircraft to enable the ship to land on and take off from land or water. The loadings taken by compartment 6 in actual operations include the weight of the plane when in contact with the landing surface as well as the dynamic forces set up in the craft while it is at rest with the motors in operation. Thus, the low pressure compartment 6 cushions the effect of the dynamic forces set up in craft while the high pressure compartments 4 and 5 absorb the dynamic load of the aircraft in the landing and take-off operations after the cushioning effect of the compartment 6 is completely taken up.

It has been found that the air pressure employed in the inflation of the compartment 6 should be in the neighborhood of 60 per cent of the inflation pressure of the compartments 4 and 5 for satisfactory results. It is also desirable to have the volume of the compartments 4 and 5 be roughly in the proportion of the volumes illustrated in Fig. 3 of the drawings to insure the maximum cushioning effect. These features, as will be readily understood, are capable of some adjustment and revision without materially affecting the efficiency of the float structure 1, it being understood that any change in the cross-sectional dimensions of the compartments will necessitate some variation in the inflation pressures for these compartments.

It is also necessary to take into consideration in the design of the float structures of the invention, with particular emphasis upon the cross-sectional dimensions of the several inflatable compartments thereof, the altitude range of the aircraft on which the floats are to be employed. Wide variations in altitude tend to build up increased pressures in the inflated compartments due to the diminution of the external atmospheric pressure at high altitudes. Thus, it is necessary to insure that the fabric employed in the fabrication of the float structure 1 is of sufficient strength to withstand the stresses involved.

The float structure 1, when in contact with a landing surface, assumes a shape closely approximating that illustrated in Fig. 4 of the drawings. The weight of the craft itself causes the low pressure compartment 6 to flatten out to an extent such that the rubberized fabric envelope 9 defining that compartment nearly contacts the fabric material 7 enclosing the internally disposed high pressure compartments 4 and 5. In this distorted or flattened form the low pressure compartment 6 acts as a cushion for the absorbtion of the dynamic forces created chiefly by the action of the rotor blades when the ship so equipped is at rest upon a landing surface.

The plate or saddle 20 is so designed that it insures a broad surface of contact with the top portion of the float structure 1 to enable a more even distribution over the entire float structure of the forces set up in the aircraft on which the floats are mounted under all operating conditions. For most satisfactory results in the design of such landing gear as that to which the invention relates, the product of the area of contact between the saddle 20 and the high pressure compartments 4 and 5 of the float structure 1 and the fluid pressure in these compartments must always be in excess of the product of the area of contact of the bottom surface of the float structure with the landing surface and the fluid pressure in the low pressure compartment 6. If the reverse condition is obtained, the saddle 20 will cause the forces incident to the operation of the craft to be concentrated at the central axis of the float structure 1 resulting in the crushing in of the top surface thereof or in destruction of the saddle itself.

The design conditions previously discussed can best be illustrated by a mathematical formula. Where A represents the area of the contact surface of the saddle 20 with the top of the float structure 1 in square inches, P is the pressure of the fluid in the high pressure compartments 4 and 5 in pounds per square inch, B is the area of contact of the low pressure compartment 6 with the landing surface in square inches, and Q represents the pressure of the fluid in the compartment 6 in pounds per square inch, the formula $AP > BQ$ governs the optimum design of the saddle structure 20 and the float structure 1. Unless the foregoing relation is carefully calculated and maintained in the design of the saddle 20 and the float structure 1, the landing gear will be unstable.

A modification of the structure of Figs. 1 to 4, inclusive, is illustrated in Figs. 5 and 6 and the same principles of the invention are involved therein. The modified structure embodies only a single high pressure compartment 28 disposed internally of the low pressure compartment 29 and substantially completely encircled by the latter. The compartment 29 is formed within the rubberized fabric enclosure 30 while the compartment 28 is defined by fabric enclosure 31. The chafer strip assembly 32 is identical to the assembly 12 of the float structure 1.

The valves 33 for admitting fluid under pressure to the compartment 29 as well as the valve (not shown) for inflating the compartment 28 are substantially the same as those employed in the form of float structure 1 illustrated in Fig. 3. The saddle 34 and its associated mounting elements differ primarily in the shape of the saddle itself as will be seen from a comparison of the parts between Figs. 3 and 5. If desired, two narrow felt strips 35 may also be substituted for the single strip 21.

Other modifications may be made in the apparatus of the invention without in any way departing from the spirit or scope of the invention. While in accordance with the patent statutes certain embodiments of the invention have been illustrated and described in detail, it is to be particularly understood that the invention is not limited thereto or thereby, but that the inventive scope is defined in the appended claims.

We claim:

1. A pneumatic-type universal landing gear for aircraft comprising an inflatable structure embodying a plurality of hollow generally tubular compartments of rubberized fabric material arranged in mutually parallel relation to each other, one of said compartments being so disposed that it at least partially encompasses the others; means for inflating each individual compartment with fluid under pressure to provide a pressure differential between the several compartments; and saddle means conforming to the contour of the inflatable structure for mounting the same on the aircraft and distributing to the several compartments the static loads as well as the dynamic loads induced in the aircraft in its landing and take-off operations and while at rest on a landing surface with its motors operating.

2. A pneumatic-type universal landing gear for aircraft comprising an inflatable structure embodying at least two hollow generally tubular compartments of rubberized fabric material arranged in mutually parallel relation to each other with one of said compartments being so disposed that it substantially completely encompasses the other; means for inflating each individual compartment with fluid under pressure to provide a pressure differential between the several compartments; saddle means conforming generally to the contour of the inflatable structure for mounting the same on the aircraft, said saddle means extending substantially coextensively with the inflatable structure and distributing the static and dynamic loads induced in the aircraft to the several compartments; and chafer means on that portion of the surface of the encompassing compartment of the inflatable structure substantially diametrically opposite that on which the saddle means are mounted.

3. A pneumatic-type universal landing gear for aircraft comprising an inflatable structure embodying a plurality of hollow generally tubular compartments of rubberized fabric material at least two of which are arranged in mutually parallel and at least partial contiguous relation to each other while a third is so disposed that it at least partially encompasses the two contiguous compartments; means for inflating each individual compartment with fluid under pressure to provide a pressure differential between the contiguous compartments and the encompassing compartment; saddle means conforming generally to the contour of the contiguous compartments of the inflatable structure for mounting the same on the aircraft, said saddle means extending substantially coextensively with the inflatable structure and distributing the static and dynamic loads induced in the aircraft to the several compartments; chafer means on the encompassing compartment of the inflatable structure opposite the position of the saddle means; and means for demountably attaching said inflatable structure to said saddle means.

4. A saddle for mounting on aircraft a pneumatic-type landing gear embodying at least two generally tubular compartments of rubberized fabric and the like, one of which has a higher fluid pressure than the other, one of said compartments being engaged by the saddle and one for contact with a landing surface, said saddle having an arcuate surface conforming generally to the shape of the compartment which it contacts when assembled and having a surface area which exceeds the product of the ratio of the fluid pressure in the low pressure compartment to the fluid pressure in the high pressure compartment and the area of the compartment in contact with the landing surface when the craft is at rest thereon.

5. A saddle for mounting on aircraft a pneumatic-type landing gear embodying a pair of contiguously arranged generally tubular compartments of rubberized fabric forming the top portion of the gear and a third rubberized fabric compartment associated therewith for contact with a landing surface, the pair of compartments being inflated at a higher fluid pressure than the third compartment, said saddle having a generally arcuately shaped surface closely conforming to the shape of the outer peripheral walls of the pair of tubular compartments and extending substantially coextensively therewith, said surface having an area which exceeds the product of the ratio of the fluid pressure in the low pressure compartment to the fluid pressure in the high pressure compartment and the area of the third compartment in contact with the landing surface when the craft is at rest thereon.

6. A universal landing gear for helicopter aircraft and the like comprising a pneumatic-type float structure embodying a pair of contiguously arranged generally tubular inflatable compartments of rubberized fabric forming the top portion thereof and a common inflatable compartment extending in parallel relation to the aforementioned compartments and forming the end portions therefor for contact with a landing surface, said common compartment having a lower fluid pressure than the pair of compartments; a saddle having a generally arcuate mounting surface extending substantially coextensively with a pair of high pressure compartments and closely fitting the outer walls thereof, said mounting surface having an area which exceeds the product of the ratio of the fluid pressure in the common compartment to the fluid pressure in the pair of compartments and the area of that portion of the common compartment which contacts the landing surface when the craft is at rest thereon;

and means disengageably securing the float structure to the saddle.

7. In a helicopter, a body having operating parts that vibrate under some conditions, in combination with means for preventing such vibrations from being transferred to a supporting surface for said aircraft and transferred back to said aircraft in phase with such vibrations consisting of one or more floats, each float having a pair of upper cells and a lower cell containing gas at different pressures in different cells, said lower cell having a bottom wall comprising a landing surface engaging portion and connection means between the upper cells and said body.

8. A float for helicopters comprising a first variable volume chamber having a bottom wall constituting a landing surface engaging portion and containing a gas at a pressure to provide a natural vibration for its walls at a first frequency, and at least one other variable volume chamber above said first chamber having means for connecting the float to the body of the helicopter and adapted to contain a gas at a different pressure to provide a natural vibration for its walls at a second frequency.

9. A float for a helicopter comprising an elongated envelope of expansible material having longitudinally extending partitions dividing said float into a plurality of upper side-by-side cells and a single lower cell, the upper wall of said lower cell constituting the bottom walls of said upper cells and the bottom wall of said lower cell constituting a landing surface contacting portion, and means carried by the external walls of said upper cells for connecting said float to a helicopter.

VALLY N. BRADEN.
FERN E. ENSLEY.

REFERENCES CITED

The following references are of record in the file of this patent:

UNITED STATES PATENTS

| Number | Name | Date |
| --- | --- | --- |
| 1,317,741 | Turnbull | Oct. 7, 1919 |
| 2,349,584 | Arnstein | May 23, 1944 |
| 2,391,326 | McKinley | Dec. 18, 1945 |
| 2,465,193 | Boyle | Mar. 22, 1949 |

FOREIGN PATENTS

| Number | Country | Date |
| --- | --- | --- |
| 115,260 | Great Britain | Apr. 29, 1918 |
| 126,934 | Great Britain | May 14, 1919 |
| 302,232 | Great Britain | Mar. 5, 1930 |